United States Patent Office 3,334,086
Patented Aug. 1, 1967

3,334,086
THIENO-PYRIDO-BENZODIAZEPIN-ONES
Hans Ott, Convent Station, N.J., assignor to
Sandoz Inc., Hanover, N.J.
No Drawing. Filed July 8, 1965, Ser. No. 470,571
6 Claims. (Cl. 260—239.3)

This invention is directed to pharmaceutically acceptable thienopyridobenzodiazepines, particularly those of the formula

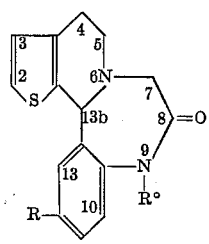

wherein

R is either a hydrogen atom (—H) or a chlorine atom (—Cl); and
R° is either a hydrogen atom (—H) or methyl;

and acid addition salts thereof. In addition, this invention is directed to the novel intermediates in the preparation of compounds I as well as the stereoisomers of compounds I.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkanesulfonic acid, such as methanesulfonic acid ($H_3C$-$SO_3H$); dibasic acids, e.g. succinic acid; tribasic acids, e.g. phosphoric acid and citric acid; saturated acids, e.g. acetic acid; ethylenically unsaturated acids; e.g. maleic acid and fumaric acid; and aromatic acids, e.g. salicyclic acid and arylsulfonic acids, such as benzenesulfonic acid. The only limitation on the acid selected is that the resulting acid addition salt be pharmaceutically acceptable; the acid does not nullify the therapeutic properties of compounds I. It is preferred, however, to select an acid so that the salt therewith is water-soluble; tartaric acid and succinic acid are preferred for this purpose.

Compounds I have one asymmetric center (C-13b) and therefore exist as a racemate or as optical antipodes (enantiomers). The stereoisomers are within the scope of this invention. Resolution of the racemate of compound I into its optical antipodes is effected according to procedures well-known to the art-skilled.

Compounds I are prepared according to the following reaction scheme:

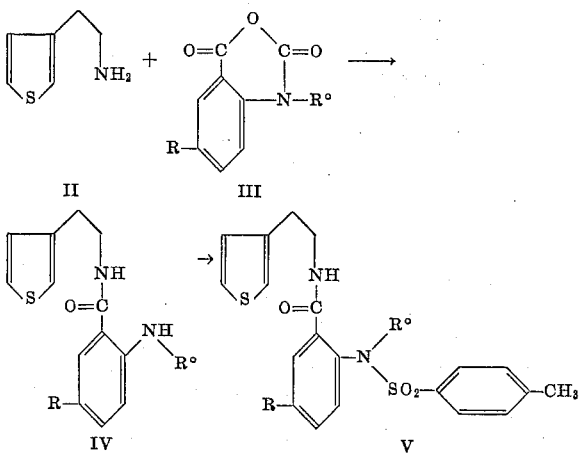

The starting materials II and III are either known compounds or are readily prepared by the art-skilled according to established procedures from available compounds.

Condensation starts rapidly at room temperature (20° C.) on admixture of compounds II and III in an inert solvent, such as tetrahydrofurane, dioxane, dimethylformamide (DMF) and dimethylsulfoxide (DMSO), with evolution of carbon dioxide; completion of the condensation is effected by heating for about thirty minutes on a steam bath. Compound IV is thereafter precipitated on addition of water to the thus-obtained solution.

To protect the amino group of intermediate IV during the ring closure, the use of said intermediate in the form of its tosylate is satisfactory, but other protecting groups, such as mesyl, brosyl and benzene sulfonyl, are alternatively employed. The preparation of the tosylate V is carried out in the usual well-known manner either under Schotten-Baumann conditions or in pyridine.

Ring closure of the tosylate to the corresponding compound VI occurs on refluxing tosylate V in admixture with phosphorus oxychloride. Other well-known dehydrating agents to bring about this ring closure are phosphorus pentoxide in xylene or polyphosphoric acid. When R° is hydrogen (—H), the reagent of choice for the ring closure is phosphorus pentoxide. Detosylation of VI is effected by dissolving same in concentrated sulfuric acid. Care must be taken to stop the reaction prior to sulfonation of the thienyl ring.

To obtain better yields, compound VI and phenol are dissolved in a glacial acetic acid solution of hydrogen bromide, and the thus-obtained solution is heated at a temperature between 50° and 60° C. This is the preferred manner for obtaining compound VII.

Compound VIII is prepared by refluxing an ethanolic solution of VII with sodium borohydride. Refluxing VIII with methyl or ethyl bromoacetate or chloroacetate and a tertiary base, e.g. triethylamine, in ethanolic solution results in the preparation of compound IX. Boiling compound IX in glacial acetic acid results in the preparation of compound I.

Other procedures for the ring closure can also be successfully employed. Such procedures are heating the ester IX in anhydrous methoxy-ethanol, containing some methoxyethoxide, for 1 to 3 hours at reflux, or saponifying the ester IX and heating the resulting amino acid to 140° to 160° C. for from 1 to 2 hours.

The isolation of chemical individuals (i.e. enantiomers) of compounds I and corresponding acid addition salts does not constitute an essential part of this invention, but the chemical individuals are within the scope of said invention. When a chemical individual I is employed as an intermediate for the preparation of an acid addition salt, the final product has the same stereochemistry as the intermediate. Likewise, optically active compounds I are prepared from corresponding optically active intermediates, e.g. that corresponding to the title compound of Example 5 is resolved by preparing the tartrate from an enantiomer of tartaric acid.

The acid addition salts are prepared according to well-established standard techniques which do not constitute part of this invention.

Compounds I and their pharmaceutically acceptable acid addition salts have CNS (central nervous system) activity. They are useful as tranquilizers, sedatives and/or sedative-hypnotics, anticonvulsants, muscle relaxants, antiinflammatories, analgesics and antianxiety drugs. They are administered either orally or parenterally in standard dosage forms in average daily doses of from 10 to 200 milligrams.

Each of the pharmaceutically active compounds of this invention may be incorporated, e.g. for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

| | Parts |
|---|---|
| Title compound of Example 7 | 60 |
| Tragacanth | 2 |
| Lactose | 29.5 |
| Corn starch | 5 |
| Talcum | 3 |
| Magnesium stearate | 0.5 |
| Alcohol SD–30 } Purified water } | q.s. |

The following examples are merely illustrative of the invention. All temperatures are in degrees Centigrade. Parts and percentages are by weight unless otherwise specified, the relationship between parts by weight and parts by volume being the same as that between the kilogram and the liter.

EXAMPLE 1

*N-(β-3-thienylethyl)-2-methylamino-5-chloro-benzamide*

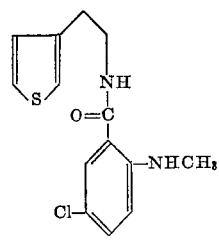

Dissolve 9 parts of β-3-thienyl-ethylamine in 35 parts by volume of dioxane and add thereto 14 parts of 6-chloro-N-methyl-isatoic anhydride. After the initial reaction ceases, heat the mixture on a steam bath for thirty minutes. After cooling, add 70 parts by volume of water thereto to cause precipitation of 20 parts of title compound, melting point (M.P). 131° to 132°. After recrystallization from ethanol/water, the melting point rises to 133° to 134°.

Replacing the 6-chloro-N-methyl-isatoic anhydride by an equivalent of either N-methyl-isatoic anhydride or 6-chloro-isatoic anhydride results in the preparation in similar manner of the corresponding compound IV.

EXAMPLE 2

*N-(β-3-thienylethyl)-5-chloro-2-methyltosylaminobenzamide*

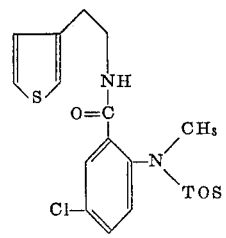

Dissolve 5.5 parts of N-(β-3-thienylethyl)-5-chloro-2-methylamino-benzamide in 25 parts by volume of pyridine and add 5.3 parts of p-toluenesulfonylchloride to the obtained solution. Heat the resulting mixture for 90 minutes at 60°. Cool the obtained clear, brown solution and add 5 parts by volume of water to the cooled solution. After maintaining the mixture for 30 minutes at room temperature, evaporate same in vacuo and transfer the residue into a separator funnel with ethyl acetate and water. Extract the organic phase twice with dilute sodium hydrogen carbonate solution. Dry the organic phase over sodium sulfate and then evaporate same in vacuo. Crystallize the obtained oily residue from diethylether. 7.2 parts of title compound, M.P. 81° to 84°, are thus obtained.

Replacing the N-(β-3-thienylethyl)-2-methylamino-5-benzamide by an equivalent of either N-(β-3-thienylethyl)-2-amino-5-chloro-benzamide or N-(β-3-thienylethyl)-2-methylamino-benzamide [prepared according to the method of Example 1] results in the preparation, in similar manner, of the corresponding compound V.

EXAMPLE 3 a. *7-(5-chloro-2-methyltosylamino-phenyl)-4,5-dihydrothieno[2,3-c]-pyridine*

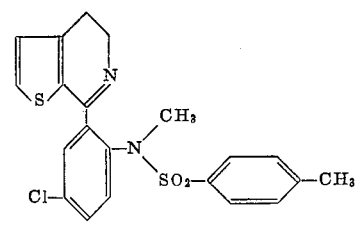

Reflux 6 parts of the title compound of Example 2 in 40 parts by volume of phosphorus oxychloride for 90 minutes. After evaporation in vacuo, dissolve the residue in methylene chloride and extract twice with 1N sodium hydroxide solution. Dry the resultant over sodium sulfate and evaporate same in vacuo to obtain 5.6 parts of title compound as an oil.

This procedure is employed only when R° is methyl.

b. 7-(5-chloro-2-tosylamino-phenyl)-4,5-dihydro-thieno-
[2,3-c]pyridine

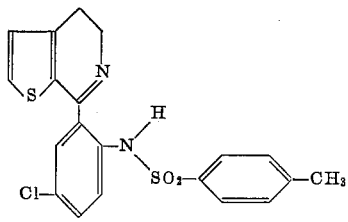

Reflux the mixture of 4 parts of N-(β-3-thienylethyl)-5-chloro-2-tosylamino-benzamide and 5 parts of phosphorus pentoxide in 40 parts by volume of dry xylene for 5 hours. Decant the xylene and decompose the residue with ice and 20% sodium hydroxide solution. Extract the alkaline aqueous phase twice with ethyl acetate; wash the organic phase with sodium chloride solution; dry the resultant over sodium sulfate and then evaporate the dried material in vacuo. Three parts of the title compound are thus obtained as a red oil.

Replacing the N-(β-3-thienylethyl)-5-chloro - 2 - tosylaminobenzamide by an equivalent of N-(β-3-thienylethyl)-2-tosylaminobenzamide results in the preparation, in similar manner, of the corresponding compound VI.

This procedure is employed when R° is either a hydrogen atom or methyl.

EXAMPLE 4

7-(5-chloro-2-methylamino-phenyl)-4,5-dihydro-thieno-
[2,3-c]pyridine

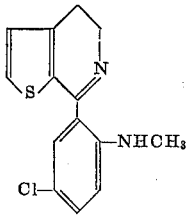

(a) Dissolve 0.5 part of the title compound of Example 3a in 3 parts by volume of concentrated sulfuric acid, and maintain the obtained solution for two hours at room temperature. Add ice and concentrated sodium hydroxide solution thereto until the thus-produced mixture is alkaline. Extract same twice with methylene chloride; wash the organic phase with water; then dry same over sodium sulfate and evaporate in vacuo. Dissolve the residue in ethylacetate and filter off the insoluble materials. After evaporation, 0.16 part of amorphous title compound results.

(b) Heat at 50° for 17 hours the mixture of 3.1 parts of the tosylate 3a and 1.44 parts of phenol dissolved in 21 parts by volume of 30% hydrogen bromide in acetic acid. Evaporate the clear solution; add ice and methylene chloride to the resultant and extract the organic phase with ice cold 2 N sodium hydroxide solution and with water. After drying over sodium sulfate and evaporation in vacuo, 2 parts of crude title compound are obtained as an oil.

Replacing 7-(5-chloro-2-methyltosylamino - phenyl)-4,5-dihydrothieno[2,3-c]pyridine by an equivalent of 7-(2-tosylamino-phenyl)-4,5-dihydro-thieno[2,3-c]pyridine results in the preparation, in similar manner, of the corresponding compound VIII.

EXAMPLE 5

7-(5-chloro-2-methylamino-phenyl)-4,5,6,7-tetrahydro-
thieno[2,3-c]pyridine

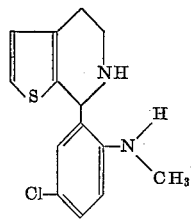

Dissolve 2 parts of 7-(5chloro-2-methylamino-phenyl)-4,5-dihydro-thieno[2,3-c]pyridine in 80 parts by volume of 90% ethanol; add 1 part of sodium borohydride thereto and reflux the resultant for 1.5 hours. After cooling, add acetic acid to destroy the excess sodium borohydride, and then acidify the mixture with hydrochloric acid. Evaporate the ethanol in vacuo, make the solution alkaline by addition thereto of dilute sodium hydroxide and extract the aqueous phase three times with methylene chloride. Collect the organic phases, dry same over sodium sulfate and evaporate in vacuo. Crystallize from ethanol to obtain the title compound, M.P. 121° to 122°.

Replacing the 7-(5-chloro-2-methylamino-phenyl)-4,5-dihydro-thieno[2,3-c]pyridine by an equivalent of 7-(2-methylamino-phenyl)-4,5-dihydro - thieno[2,3-c]pyridine results in the preparation, in similar manner, of the corresponding compound VIII.

EXAMPLE 6

7-(5-chloro-2-methylamino-phenyl)-6-carbethoxymethyl-
4,5,6,7-tetrahydro-thieno[2,3-c]pyridine

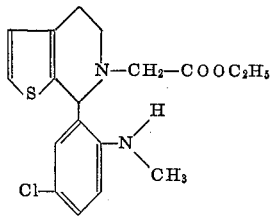

Reflux the mixture of 2 parts of 7-(5-chloro-2-methylamino-phenyl)-4,5,6,7-tetrahydro - thieno[2,3-c]pyridine, 15 parts of triethylamine and 2.4 parts of ethyl bromoacetate in 25 parts by volume of absolute ethanol for 17 hours. Evaporate the solvent, dissolve the residue in benzene and extract the organic phase twice with 0.5 N hydrochloric acid to remove unreacted starting material. Wash the organic phase with water and with sodium hydrogencarbonate. Dry the benzene solution over sodium sulphate and evaporate in vacuo to obtain 2.3 parts of title compound as a light yellow oil.

Replacing the 7-(5-chloro-2-methylamino-phenyl)-4,5,6,7-tetrahydro-thieno[2,3-c]pyridine by an equivalent of 7 - (2 - amino-5-chloro-phenyl)-4,5,6,7-tetrahydro-thieno-[2,3-c]pyridine results in the preparation, in similar manner, of the corresponding compound IX.

EXAMPLE 7

12-chloro-9-methyl-4,5,7,8,9,13b-hexahydro-thieno[2,3-c]-
pyrido[1,2-d]-[1,4]benzodiazepin-8-one

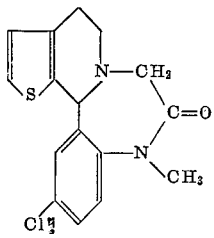

Reflux 6.3 parts of 7-(5-chloro-2-methylamino-phenyl)-6 - carbethoxymethyl-4,5,6,7-tetrahydro-thieno[2,3-c]pyridine in 70 parts by volume of glacial acetic acid for 2.5 hours, distilling off half of the solvent simultaneously. Evaporate the reaction mixture in vacuo and dissolve the residue in ethylacetate. Extract this solution three times with dilute hydrochloric acid. Neutralize the combined aqueous phases with sodium hydroxide solution and extract same three times with methylene chloride. Dry the methylene chloride solution over sodium sulfate and evaporate in vacuo. On addition of diethylether, 3.7 parts of title compound, M.P. 147° to 148° C., crystallize out.

Replacing the 7 - (5-chloro-2-methylamino-phenyl)-6-carbethoxymethyl - 4,5,6,7 - tetrahydro-thieno[2,3-c]pyridine by an equivalent of 7-(2-methylamino-phenyl)-6-carbethoxymethyl - 4,5,6,7-tetrahydro-thieno[2,3-c]pyridine results in the preparation, in similar manner, of the corresponding compound I.

It is thought that the invention and its advantages are understood from the foregoing description. Various changes may be made in the intermediates and the final products (including the pharmaceutically acceptable acid addition salts of compounds I) without departing from the spirit and the scope of the invention or sacrificing its material advantages. The starting materials, intermediates and final products set forth hereinbefore are merely illustrative embodiments.

What is claimed is:

1. A pharmaceutically acceptable compound selected from the group consisting of a compound of the formula

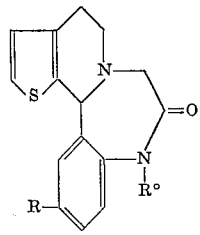

wherein

R is a member selected from the group consisting of a hydrogen atom and a chlorine atom, and R° is a member selected from the group consisting of a hydrogen atom and methyl, and an acid addition salt thereof.

2. A compound of the formula

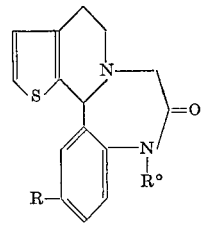

wherein

R is a member selected from the group consisting of a hydrogen atom and a chlorine atom, and R° is a member selected from the group consisting of a hydrogen atom and methyl.

3. 12- - chloro - 9-methyl-4,5,7,8,9,13b-hexahydro-thieno[2,3-c]pyrido[1,2-d][1,4]benzodiazepin-8-one.

4. 12 - chloro - 4,5,7,8,9,13b-hexahydro-thieno[2,3-c]pyrido[1,2-d][1,4]benzodiazepin-8-one.

5. 4,5,7,8,9,13b - hexahydro - thieno[2,3-c]pyrido[1,2-d][1,4]-benzodiazepin-8-one.

6. 9 - methyl - 4,5,7,8,9,13b-hexahydro-thieno[2,3-c]pyrido[1,2-d[]1,4]benzodiazepin-8-one.

References Cited
UNITED STATES PATENTS

| | | | |
|---|---|---|---|
| 2,811,527 | 10/1957 | Sheehan | 260—294.8 |
| 3,121,725 | 2/1964 | Schnitzer | 260—294.8 |
| 3,143,553 | 8/1964 | Ruschig et al. | 260—332.2 |
| 3,149,124 | 9/1964 | Krespan | 260—332.2 |
| 3,152,136 | 10/1964 | Harris | 260—332.2 |
| 3,300,481 | 1/1967 | Bell et al. | 260—239.3 |
| 3,300,482 | 1/1967 | Doebel et al. | 260—239.3 |

WALTER A. MODANCE, *Primary Examiner.*

R. T. BOND, *Assistant Examiner.*